US005174645A

United States Patent [19]

Chung

[11] Patent Number: 5,174,645

[45] Date of Patent: Dec. 29, 1992

[54] ELECTRIC CANDLE WITH SOUND PRODUCING MEANS

[76] Inventor: Martin Chung, 4-3F, No. 96, Sec. 4, Hsin Yue Road, Taipei, Taiwan

[21] Appl. No.: 827,292

[22] Filed: Jan. 29, 1992

[51] Int. Cl.[5] .............................................. H04M 1/22

[52] U.S. Cl. ...................................... 362/86; 362/342; 362/343; 362/384; 362/447; 362/802; 362/810

[58] Field of Search ................. 362/86, 157, 383, 392, 362/393, 394, 395, 447, 802, 810, 458, 186; 431/125, 288, 297, 289

[56] References Cited

U.S. PATENT DOCUMENTS

| | | | |
|---|---|---|---|
| 3,361,902 | 1/1968 | Cardenas et al. | 362/802 X |
| 3,500,126 | 3/1970 | Ford | 362/392 |
| 4,187,532 | 2/1980 | Naffier | 362/392 X |
| 4,344,113 | 8/1982 | Ditto et al. | 362/802 X |
| 4,433,362 | 2/1984 | Ban | 362/802 X |
| 4,617,614 | 10/1986 | Lederer | 362/392 |
| 4,690,242 | 9/1987 | Mark | 362/802 X |
| 4,992,912 | 2/1991 | Lee | 362/394 X |

*Primary Examiner*—Larry Jones

*Attorney, Agent, or Firm*—Lowe, Price, LeBlanc and Becker

[57] ABSTRACT

An electric candle comprised of an electric lamp supported on a cylindrical casing above a base, said cylindrical casing having conductive strips connected to a power supply in said base and controlled by a switch means consisted of a spring coil around a conductor, said base having a sound pick up, a sound producing means at the inside, wherein making a sound causes said sound pick up to connect the electric circuit permitting said lamp bulb and said sound producing means to give light and sound respectively; blowing a stream of current through vent holes on said lamp cap causes said switch means to cut off the electric circuit permitting said lamp bulb and said sound producing means to stop giving light or sound.

3 Claims, 5 Drawing Sheets

ELECTRIC CANDLE WITH SOUND PRODUCING MEANS

BACKGROUND OF THE INVENTION

The present invention relates to electric candles, and more particularly, the present invention relates to an electric candle which gives light and sound upon detection of a sound and, which stops giving light and sound upon blowing of a stream of current.

Conventionally, a candle is made of a cylindrical mass of tallow or wax with a wick through its center, which gives light when burned. Recently, many electric lamps in the shapes of candles have been used, instead of candles, in many occasions. There is also provided an electric candle with music box, which plays a music while giving light. In this structure of electric candle, the music box is controlled by a photoelectric detector. However, an electric candle keeps giving light when switched on, and can not imitate the nature of a real candle which will be extinguished upon a strong wind force.

It is therefore an object of the present invention to provide an electric candle which gives light and sound when a sound pick up therein detects a sound. It is another object of the present invention to provide an electric candle which stops giving light and sound when a spring coil is forced by a current of air to contact a conductor. It is still another object of the present invention to provide an electric candle which has a control switch to automatically turn on the lamp bulb and the sound producing means thereof within a predetermined length of time after such lamp bulb and sound producing means having been stopped, causing such lamp bulb and sound producing means to give light and sound again.

DETAILED DESCRIPTION OF THE PREFERRED EMBODIMENTS

Figure 1:
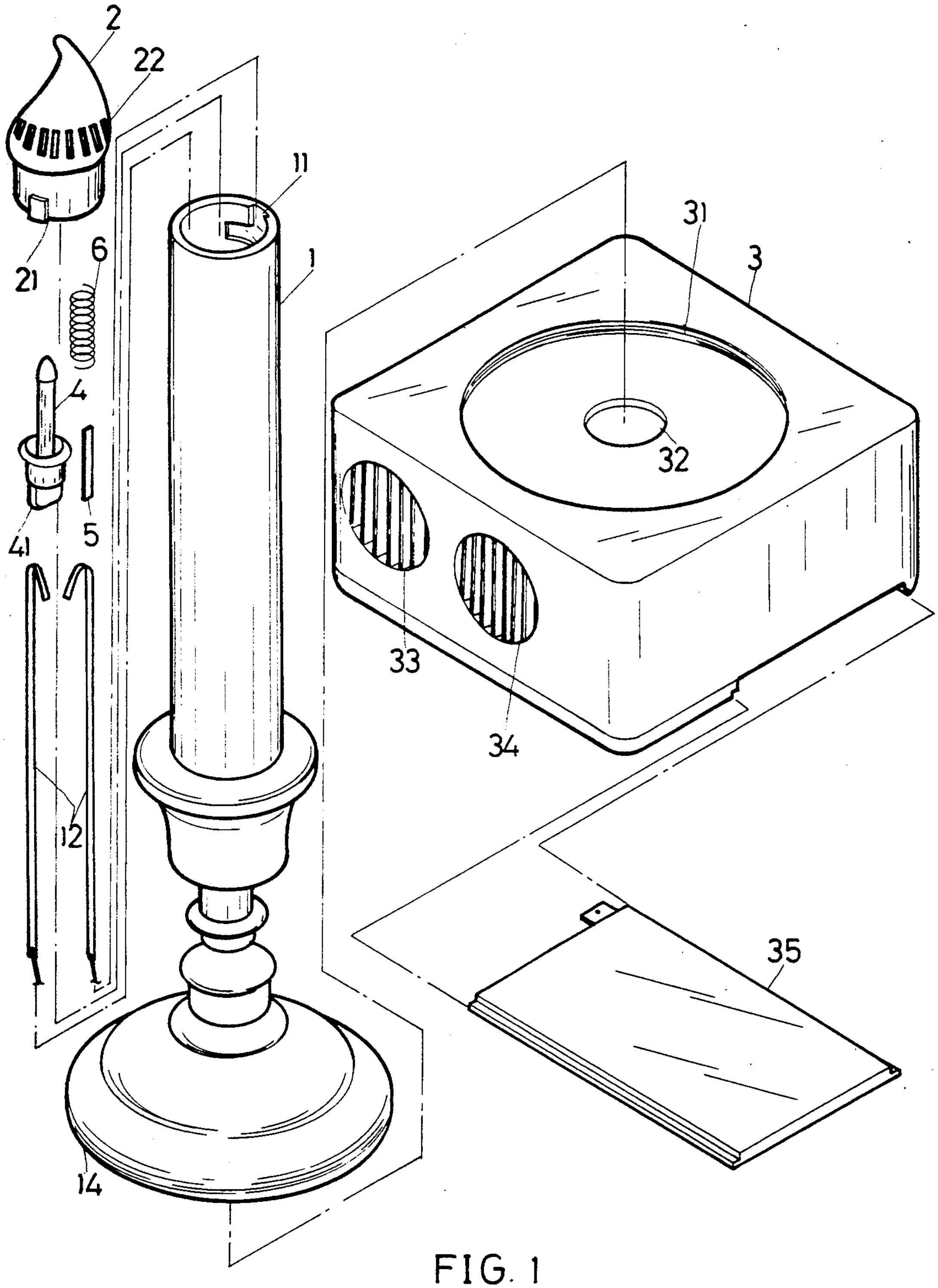
FIG. 1 is an exploded view of an electric candle embodying the present invention.

Referring to FIG. 1, an electric candle is generally comprised of a cylindrical casing 1 covered by a lamp cap 2 and supported on a base 3.

Figure 2A:
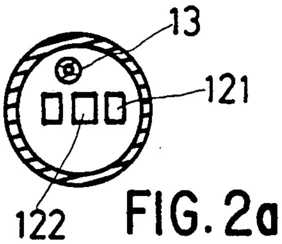
FIGS. 2*a* and 2*b* are cross sections of the electric candle taken in a longitudinal direction and a transverse cross section of the cylindrical casing.
Figure 2B:
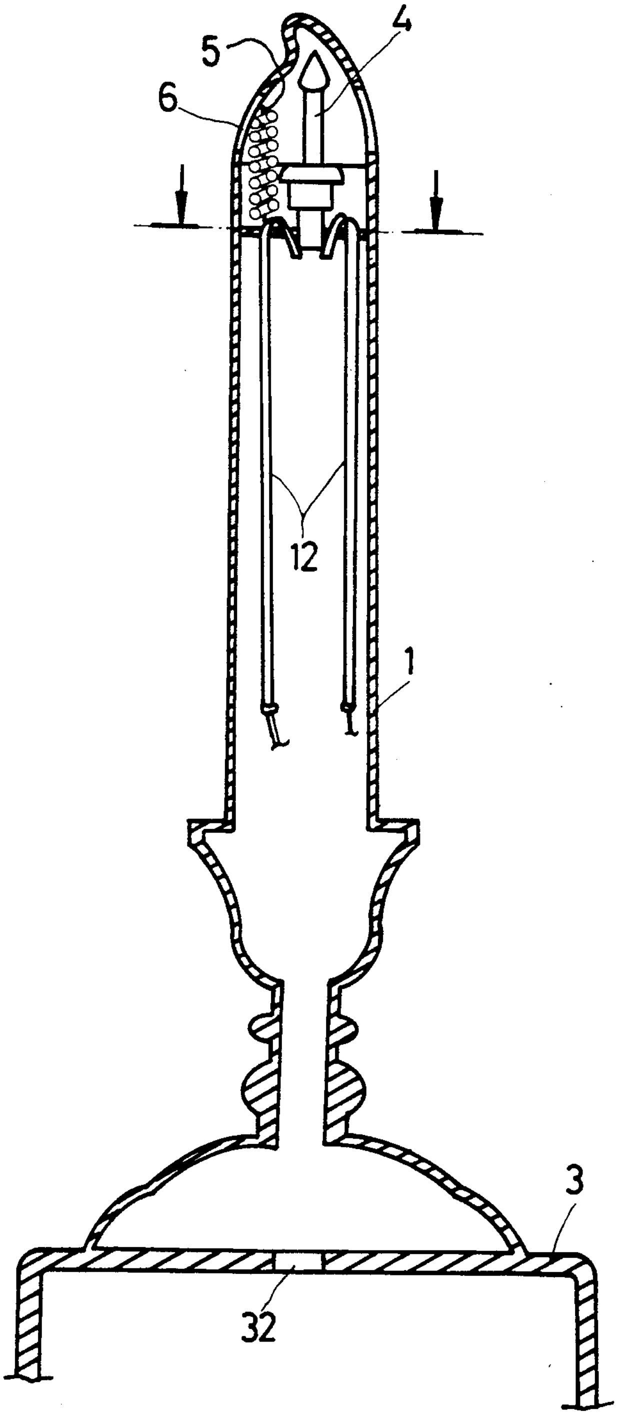
Figure 3:
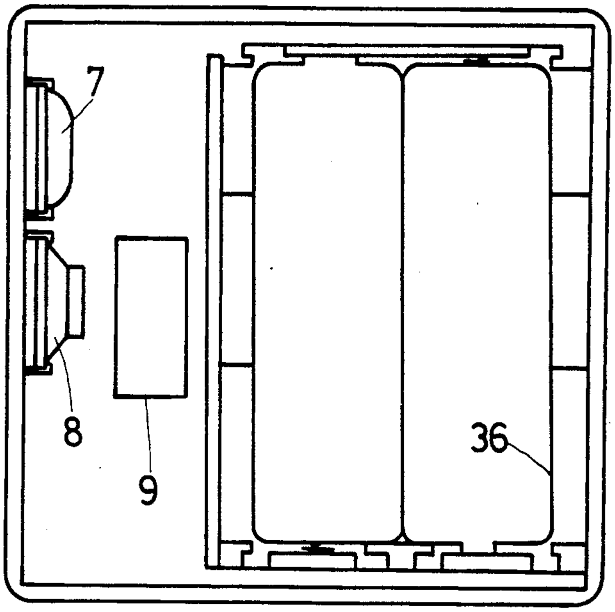
FIG. 3 is a bottom view of the base.

Referring to FIG. 2 and seeing FIG. 1 again, the cylindrical casing 1 defines therein a center hole 122 at an upper level for holding a lamp bulb 4 by a lamp holder 41, two opposite holes 121 adjacent to said center hole 122 at two opposite sides for inserting two elongated conductive strips 12, and a circular recessed hole 13 at a suitable location for holding a conductor 5 and a spring coil 6. The cylindrical casing 1 further comprises a retaining notch 11 on the top edge thereof for fastening lamp cap 2, and a male thread 14 around the periphery of the bottom end thereof for connecting to the base 3. The lamp cap 2 is made in the shape of the flame of a burning candle, having a retaining block 21 at a location corresponding to the retaining notch 11 on the cylindrical casing 1, and a plurality of vent holes 22 around the peripheral surface thereof for ventilation. By fastening the retaining block 21 in the retaining notch 11, the lamp cap 2 is firmly secured to the cylindrical casing 1 at the top and covered over the lamp bulb 4, the conductor 5 and the spring coil 6 (see FIG. 2). The base 3 is formed of a box having a female thread 31 and a wire hole 32 at the top for fastening the cylindrical casing 1 and inserting electric wires respectively, a sound intake hole 33 and a speaker aperture 34 on the peripheral wall thereof at one side for holding a sound pick up 7 and a speaker 8 respectively (see FIG. 3), a music IC 9 and a battery chamber 36 at the inside, a battery lid 35 covered on said battery chamber 36. The dry battery set which is fastened inside the battery chamber 36, the conductive strips 12, the spring coil 6, the conductor 5, the lamp bulb 4, the sound pick up 7, the speaker 8 and the music IC 9 form into an electric circuit, wherein the spring coil 6 and the conductor 5 form into a switch for the electric circuit.

Figure 7:
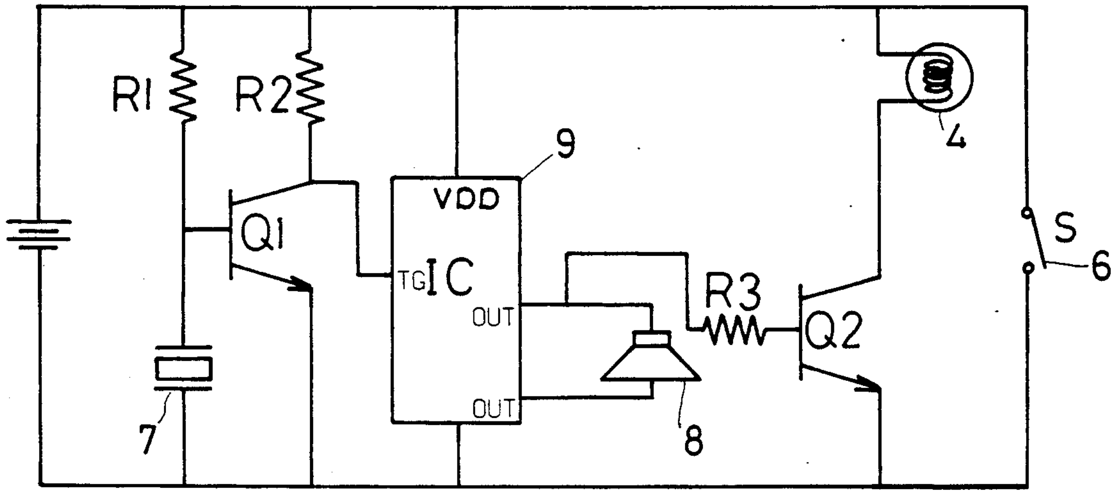
FIG. 7 is a circuit diagram of the electric circuit of the electric candle.

Referring to FIG. 7, therein illustrated is the circuit diagram of the electric circuit of the electric candle of the present invention, which is consisted of resistors R1, R2, R3, transistors Q1, Q2, a sound pick up 7, a music IC 9, a speaker 8, a lamp bulb 4, and a switch S (the switch S is formed of the spring coil 6 and the conductor 5). The resistors R1, R2 are connected in parallel, wherein the resistor R1 is connected to the base of the transistor Q1 and the sound pick up 7; the resistor R2 is connected to the collector of the transistor Q1 and the TG terminal of the music IC 9. The music IC 9 is further connected to the resistor R3 via the speaker 8. The resistor R3 has an opposite end connected to the base of the transistor Q2. The lamp bulb 4 is connected to the collector of the transistor Q2.

The operation of the present invention is outlined hereinafter. When a sound is detected by the sound pick up 7, the switch S is electrically connected causing the lamp bulb 4 to be electrically connected for giving light, and at the same time, the music IC 9 is triggered to produce a music for output through the speaker 8. Blowing a stream of current through the vent holes 22 into the lamp cap 2 causes the conductor 5 to contact the spring coil 6, and therefore, the electric circuit is short circuit to cut off the lamp bulb 4 and the speaker 8 causing the speaker 8 and the lamp bulb to stop giving sound or light.

Figure 4:
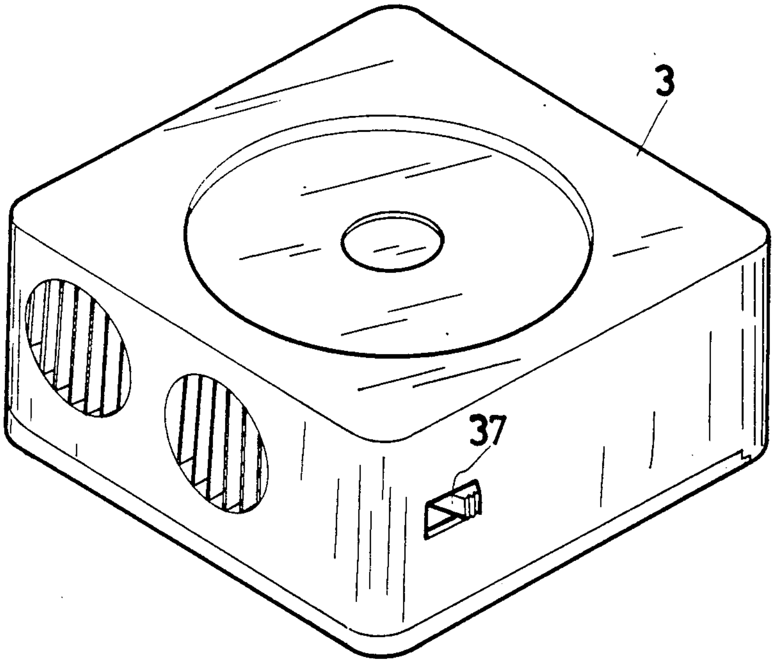
FIG. 4 is an elevational view of an alternate form of the base.

Referring to FIG. 4, a control switch 37 may be fastened in a hole (not indicated) on the base 3 and connected to the electric circuit for turning on the lamp bulb 4, the music IC 9 and the speaker 8 within a predetermined length of time after the electric circuit having been short circuit.

Figure 5:
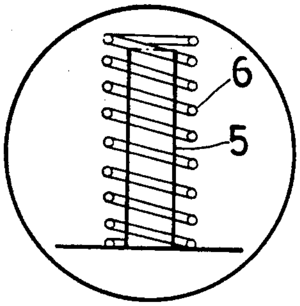
FIG. 5 illustrates the arrangement of a spring coil and a conductor for controlling the electric circuit of the electric candle.

Further, the electric circuit may be controlled through touch control (instead of sound control). As illustrated in FIG. 5, a spring coil is mounted around a conductor. Touching the cylindrical casing of the electric candle causes the spring coil to electrically connect or disconnect the conductor, and therefore, the electric circuit of the electric candle is electrically connected or disconnected in triggering the lamp bulb or the speaker to operate or stop operating.

Figure 6:
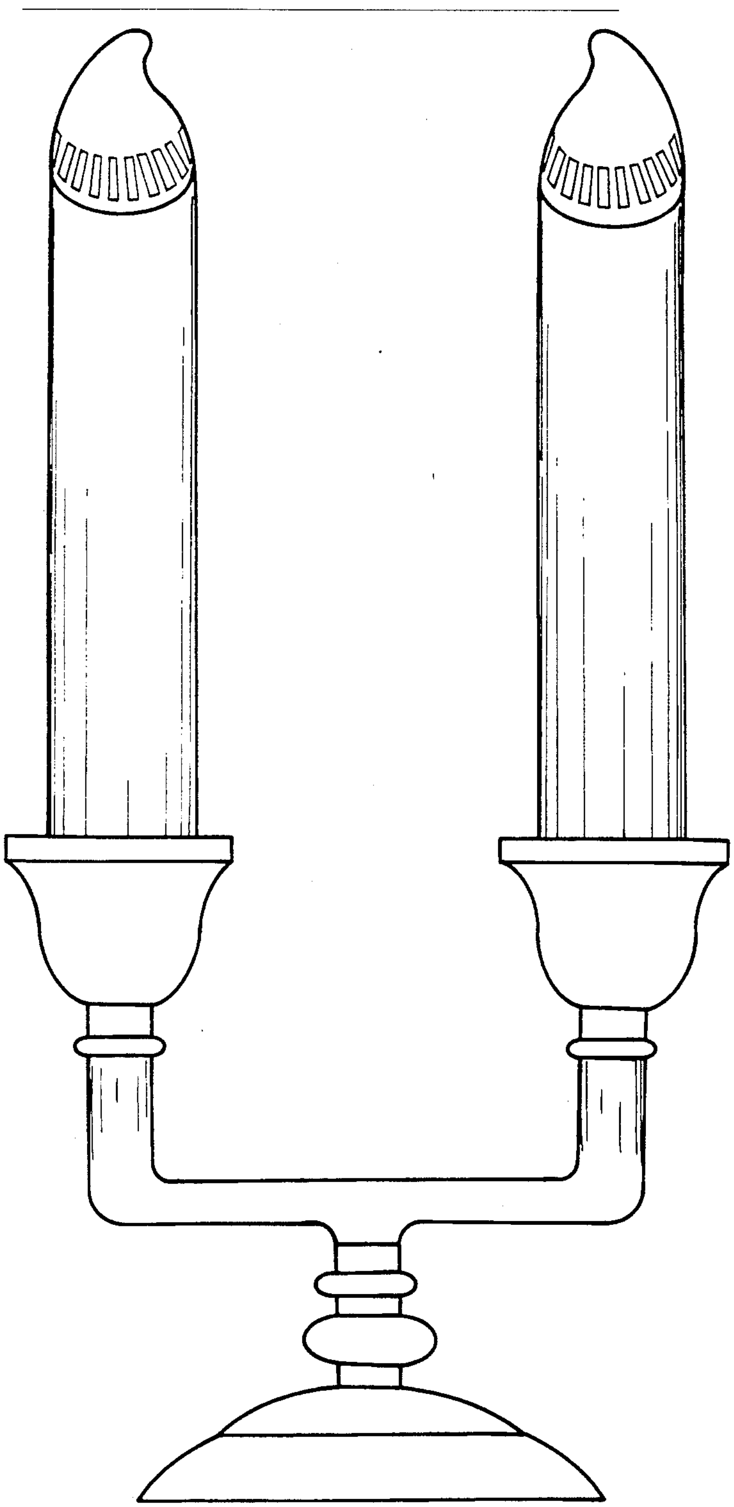
FIG. 6 is an elevational view of an alternate form of the present invention.

Referring to FIG. 6, the present invention may be made in the form of a candelabrum.

It is apparent that numerous modifications and substitutions can be had to the aforedescribed embodiments without departing from the spirit of the invention. Accordingly, the aforedescribed embodiments are intended for purposes of illustration and not as limitation.

What is claimed is:

1. An electric candle comprising a lamp bulb supported on a cylindrical casing above a base and covered by a lamp cap, an electric circuit connected to a power supply, a sound producing means, and a switch means connected between said electric circuit and said lamp bulb and sound producing means, said switch means being comprised of a spring coil mounted around a conductor, and characterized said switch is switched on upon detection of a sound by a sound pick up fastened inside said base, causing said lamp bulb and said sound producing means to give light and sound respectively; said switch is switched off by blowing a current of air through vent holes on said lamp cap to force said spring coil to contact with said conductor, causing said lamp bulb and said sound producing means to stop giving light or sound.

2. The electric candle of claim 1, wherein said base further comprises a control switch to automatically switch on said switch means within a predetermined length of time after said lamp bulb and said sound producing means having been stopped, causing said lamp bulb and said sound producing means to give light and sound again.

3. The electric candle of claim 1, wherein said switch means is controlled to turn on said lamp bulb and said sound producing means through touch control.

* * * * *